Nov. 17, 1964   F. R. DICKEY, JR   3,157,876
VELOCITY MEASURING SYSTEM
Filed Feb. 16, 1961   4 Sheets-Sheet 1

DIRECTION OF MOTION

INVENTOR:
FRANK R. DICKEY, JR.
BY *Dudley J. Ready*
HIS AGENT.

Nov. 17, 1964  F. R. DICKEY, JR  3,157,876
VELOCITY MEASURING SYSTEM
Filed Feb. 16, 1961  4 Sheets-Sheet 3

INVENTOR:
FRANK R. DICKEY, JR.
BY
HIS AGENT.

DIRECTION OF MOTION

United States Patent Office 3,157,876
Patented Nov. 17, 1964

3,157,876
VELOCITY MEASURING SYSTEM
Frank Ramsey Dickey, Jr., De Witt, N.Y., assignor to General Electric Company, a corporation of New York
Filed Feb. 16, 1961, Ser. No. 89,878
10 Claims. (Cl. 343—8)

The present invention relates to velocity measurement and has as an object thereof to provide a novel system for measuring the relative speed and direction of motion of a first body relative to a second body. The present invention relies upon the production of a standing wave pattern relative to the second body and the detection thereof by the first body. The invention is particularly applicable to the measurement of the velocity of vehicles in the neighborhood of astronomical bodies.

The present invention is applicable to the solution of a wide range of velocity measurement problems. Since the invention requires no mechanical contact between the bodies, the invention is particularly useful in the measurement of the velocity of bodies in space or in fluid media. The invention thus provides means for the measurement of the true vector velocity of a space vehicle relative to an astronomical body and other associated displacement and rate quantities.

Prior art navigation systems have utilized a variety of data sources, each of which introduces problems in obtaining sufficient accuracy and in practical realization. For example, in inertial systems, it is generally necessary to integrate acceleration to obtain velocity and then integrate velocity to obtain displacement. Accordingly, an error in the measurement of acceleration over a period of time is reflected in an accumulated velocity error which will continuously increase the error in the displacement proportionately to the lapse of time. Also, inertial systems generally require an orientational reference which is a stable platform to support the acceleration measuring devices which are difficult to realize and add volume and weight to the system. Another type of navigation system utilizes Doppler radar to measure the velocity of a vehicle relative to the ground. That is, a radio beam is transmitted toward the ground forward of the vehicle and the Doppler frequency shift of the echo is measured to obtain the vehicle speed. This system has the advantage of continuously measuring speed. However, it also necessitates the addition of a transmitter to the vehicle of sufficient power to produce echoes to the vehicle naviagation apparatus.

Accordingly, it is an object of this invention to provide a navigation system which does not require a vehicle borne transmitter.

A further object of the invention is to provide a navigation system which does not require stabilization of the measuring apparatus.

Briefly stated, in accordance with one aspect of the invention, apparatus is provided for measuring the velocity of a space vehicle relative to a body such as the moon. A transmitter on the earth transmits a continuous, single frequency, microwave signal directed at the moon, the surface of which reradiates the signal to produce a standing wave pattern in the vicinity of the moon. A pair of antennae are arranged on the vehicle in alignment with the vehicle axis along which it is desired to measure velocity. Receiving means, responsive to the signal trains received by the antennae, measure the time delay between the signal trains which produces an optimum correlation therebetween. Since the vehicle velocity along the antenna axis is simply the antenna separation distance divided by traversal time, and since the distance is a known constant, the velocity is obtained by a direct calibration of the delay time.

The features of the invention which are believed to be novel are set forth with particularity in the appended claims. The invention itself, however, both as to its organization and method of operation, togeher with further objects and advantages thereof, may best be understood by reference to the following description when taken in connection with the drawings wherein:

Figure 1:
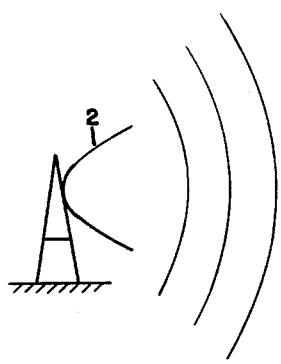
FIGURE 1 is an illustration of the relationship between a transmitter on the earth and the moon's surface whereby a standing wave pattern is established in accordance with the disclosed invention.
Figure 1:
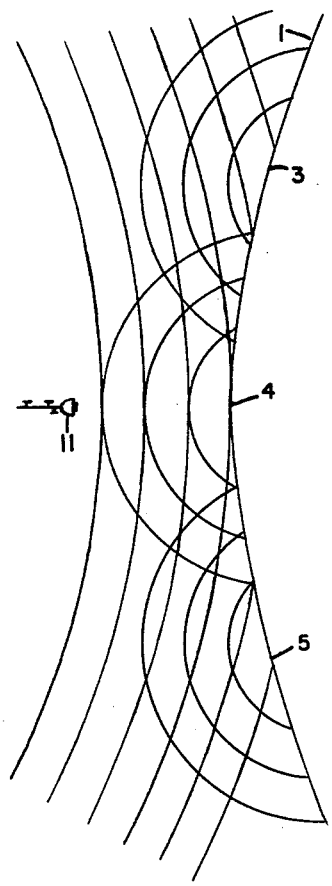

FIGURE 1 illustrates an arrangement for providing an electromagnetic standing wave pattern in accordance with one embodiment of the invention. An electromagnetic field is produced in the vicinity of a body 1, such as the moon, by a radiator 2 on the earth which transmits a continuous wave (C.W.) radio signal at an S-band frequency. A very complex wave pattern is produced near the moon surface due to reradiation from that surface in the form of reflections and scattering. These reradiations originate at all illuminated portions of the moon, representative reradiation sources being indicated by reference characters 3, 4 and 5. The result is that a practically random standing wave pattern of electromagnetic radiations is produced by the interferences of the reradiations.

At the present time, the reradiation characteristics of the moon are imperfectly known. However, the available data indicate an average power reflection coefficient of the moon on the order of one one-hundredth. All the reradiation taken together produces an electromagnetic field strength which is typically on the order of one-tenth of the field produced by the direct radiation from antenna 2 up to several hundred miles from the moon's surface. This results in what is essentially an amplitude modulation as a function of position on the direct radiation. The angular position of a transmitter on earth as viewed from the moon is almost constant, the maximum libration rate being of the order of $10^{-6}$ radians per second. The rate of change of distance between the earth and the moon is relatively small and its first order effect is merely a frequency shift, the amount of which is the same for each of the component waves which form the irregular pattern. Thus in spite of the Doppler shift, the wave pattern resulting from reradiation is stationary, to a good approximation, with time.

Figure 2:
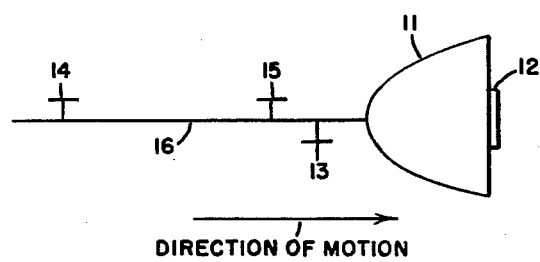
FIGURE 2 is an illustration of a representative antenna array on a vehicle suitable for measuring velocity in the standing wave pattern of FIGURE 1.

FIGURE 2 illustrates a representative vehicle for which velocity and other data are to be obtained. The vehicle 11 is guided by a braking rocket 12 in accordance with commands derived from the signals received by antennae 13, 14 and 15 mounted on the antenna wand 16. The vehicle 11 is designed to move from left to right as indicated in FIGURE 2. The antennae are accordingly substantially aligned with the desired axis of motion. The wand 16 on which the antennae are mounted is preferably rotated at a low rate, typically 10 c.p.s. The antennae, which may be dipoles, are preferably designed to have axial symmetry but the axis of symmetry is slightly displaced from the wand axis. The arrangement of the antennae for rotation and with displaced symmetrical axes is to enable the measurement of pitch, roll and yaw, as will be more fully described hereinafter. The three antennae 13, 14 and 15 actually form two pairs. Common antenna 13 and the remote antenna 14 form a pair of antennae for normal fine speed measurement. The common atenna 13 and the near antenna 15 form an antenna pair for the coarse acquisition of speed data upon first approaching the moon.

As the vehicle moves with a velocity parallel to the wand axis through an electromagnetic standing wave pattern such as that illustrated in FIGURE 1, each antenna successively receives the same complex signal. Accordingly, since the distance between antennae is fixed, it is only necessary to measure the displacement in time between the received signals to obtain the speed of the vehicle relative to the standing wave pattern and hence the moon.

Figure 3:
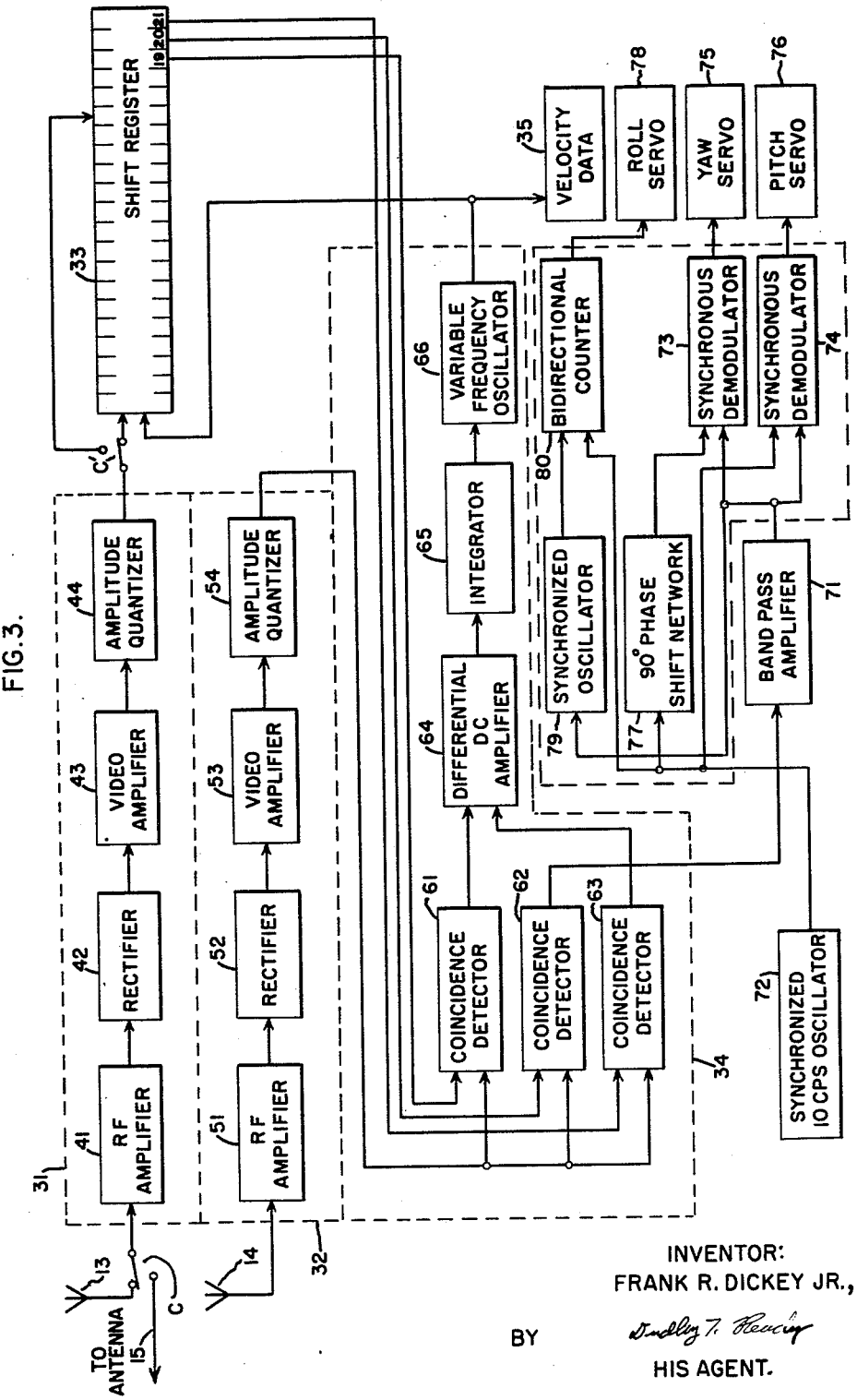
FIGURE 3 is a block diagram of correlation receiving apparatus to measure the time differential between signals received by pairs of antennae in FIGURE 2.

FIGURE 3 illustrates in block diagram form preferred apparatus for measuring the time differential between the signals received by the pairs of antennae. The signals received on antennae 13 and 14 are shaped by channels 31 and 32, respectively. Each channel continuously senses the received signals and quantizes the received signals into an output which is equal to either a positive or negative reference voltage in accordance with the received signals. That is, each channel output is a train of pulses of "1"'s and "0"'s practically random in duration and occurrence and having a rate proportional to vehicle speed. (Representative input and output waveforms appear in FIGURE 4.) In general, the outputs of both channels are the same random train of pulses, but the train of pulses produced by the trailing antenna trails the leading antenna train by the time the vehicle takes to traverse the distance between antennae. The output of the lead channel is connected to a variable delay element provided by shift register 33 and delayed outputs of delay element 33 are connected to a comparator circuit 34 which also receives the output of the lag channel 32. The comparator circuit 34 produces as an output a series of pulses having a frequency determined by the time lag between signals received by the antennae. The output of comparator 34 is connected to the delay line 33 to control the time delay of the lead channel pulse train and the output is also conveniently connected to a frequency meter to provide an output indication.

Channels 31 and 32 are identical and are arranged to process the signals received on antenae 13 and 14, respectively. The signals are respectively amplified in conventional microwave RF amplifiers 41 and 51 suitable for use at the indicated operating frequency and detected by rectifiers 42 and 52. The output of the rectifiers is an audio frequency signal, the frequency being a function of the speed of the vehicle. Further amplification is provided in video amplifiers 43 and 53 having a bandwidth sufficient to pass the random audio signal variations. The signals are quantized, conveniently by hard limiting, in amplitude quantizers 44 and 54. The limiting is conveniently provided by conventional elements such as 6AU6 tubes.

The output of channel 31 from quantizer 44 is delayed by a shift register 33 having a variable clock rate. Three outputs are taken from the shift register at the last three stages, the center output derivation (conveniently the twentieth stage) providing an output corresponding to the signal received by antenna 13 delayed to be in synchronism with the signal received by antenna 14. The maintenance of the proper delay is by controlling the shift rate with a variable frequency oscillator (that drives the shift register) which in turn is controlled by the received signals. The output of the shift register 33 is accordingly a (delayed) sampling of the channel 31 output. The sampling rate is proportional to the vehicle speed and therefore variable. For measuring a speed range up to 10,000 feet per second, an oscillator frequency range extending to 100 kc. suitable for a 2 kmc. transmitted signal.

To control oscillator 66, a pair of coincidence detectors 61 and 63 are respectively connected to the first and third outputs of the shift register 33. Each coincidence detector is also connected to the output of channel 32. These coincidence detectors are conveniently half adders which produce a reference voltage at their outputs when the input signals coincide. In this manner, the output of channel 32 is sampled in accordance with the sampling of channel 31. The coincidence detectors 61 and 63 are connected to a differential D.C. amplifier 64 which produces an output in accordance with the difference between the detector outputs. This difference is then integrated by integrator 65 to produce a voltage whose amplitude is proportional to the difference in correlation. The integrator 65 is conveniently a low pass filter having a one second time constant to provide control of a variable frequency oscillator 66. Oscillator 66 oscillates at a frequency corresponding to vehicle velocity, the frequency range extending to 100 kc. as noted above. In addition to driving the shift register 33 to provide the desired delay, it is also connected to the desired utilization device such as a velocity data indicator 35, conveniently a frequency meter capable of operating in the audio range.

Figure 4:
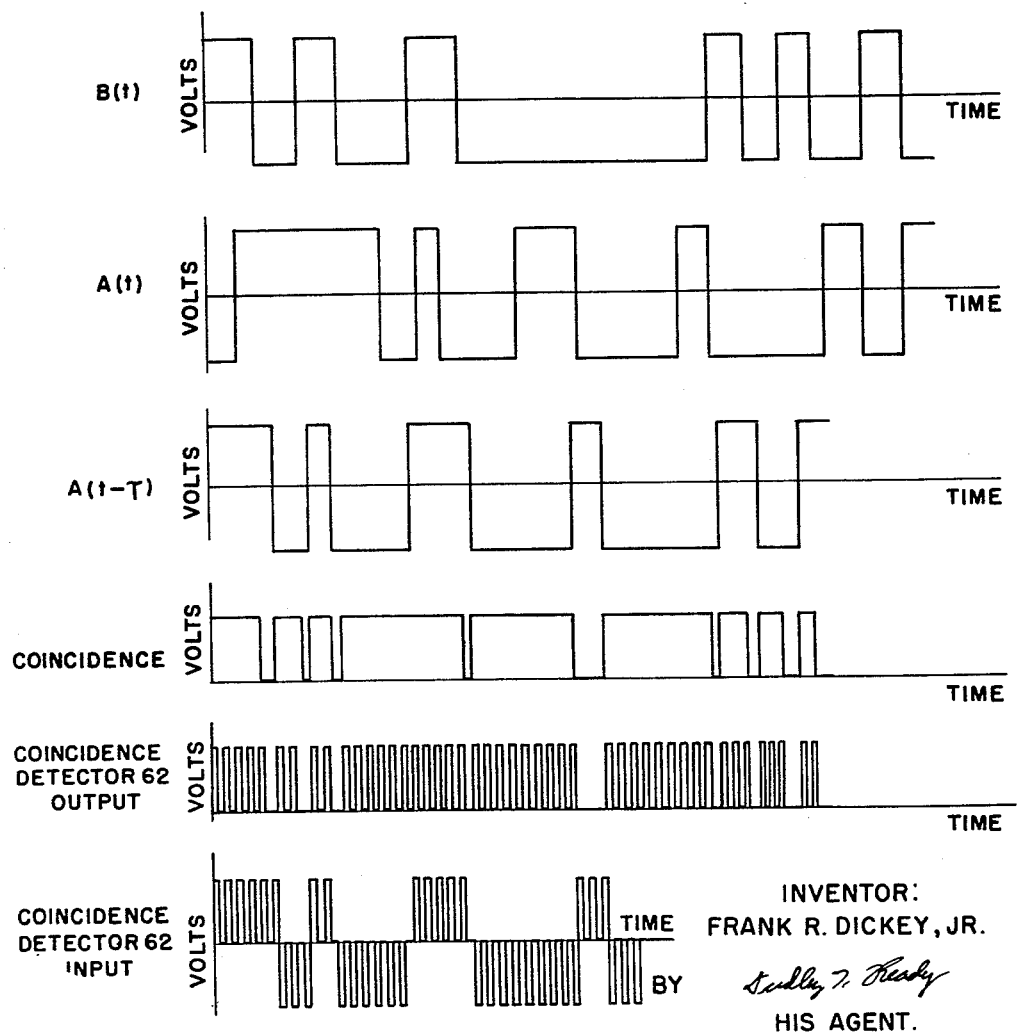
FIGURE 4 is a series of graphical plots of the signals received by the FIGURE 2 antennae and produced by the FIGURE 3 apparatus.

FIGURE 4 illustrates some representative signals plotted graphically as voltage against time at the input and output of the channels 31 and 32 and the output of amplifier 64, etc. In the top line, the waveforms of the signals received at antennae 13 and 14 are shown at A and B respectively. Both waveforms are essentially the same, irregular, noise-like, received signal with a time displacement, $s/v$, determined by the antenna separation distance, $s$, divided by the vehicle velocity, $v$. The waveforms A and B will differ in shape somewhat due to noise, misalignment of the antenna trajectories and other causes. However, the shape of the waveform is not of any substantial significance in itself. In measuring the vehicle velocity, it is only necessary to determine the time differential between the signal trains received at the two antennae. Accordingly, it is sufficient to delay the first signal train by a time increment equal to the time differential between the received signal trains and compare the delayed signal train with the second signal train to provide an error signal to maintain the proper optimum coincidence of the compared signals.

In the second and third lines of FIGURE 4, the signals $A(t)$ and $B(t)$ received by the antennae are shown as quantized about an intermediate signal level D, i.e., input signals above this level appear as a positive reference voltage while signals below this level appear as a negative reference voltage. These waveforms correspond to the respective outputs of channels 31 and 32 in FIGURE 3 where the received signals are detected, amplified and severely limited. In the fourth line of FIGURE 4, quantized signal $A(t)$ is shown delayed by a time increment $\tau$, which corresponds to the center output of the shift register 33. The fifth line of FIGURE 4 is a graph of the coincidence between the signals $B(t)$ and $A(t-\tau)$. The coincidence output is a D.C. reference voltage when the compared signals have the same polarity and is zero when the polarities differ. The relative coincidence of signals over a period of time produces the average voltage which is a measure of their correlation.

In the sixth line of FIGURE 4 appears a graph of the output of coincidence detector 62. This signal is a pulse train having a frequency equal to that of the variable frequency oscillator 66 which drives shift register 33 and thereby determines the sampling rate. The output of the shift register 33, which is the signal $A(t-\tau)$ in sampled form, is compared with the output of channel 32, is the signal B(*t*), in the coincidence detector 62. Accordingly, this detector output is a pulse train having a frequency proportional to the vehicle speed and occurring when the signals $A(t-\tau)$ and $B(t)$ coincide. That is, the output is a pulse train which is present within the envelope of the fifth line of FIGURE 4.

The input waveform to coincidence detector 62 produced at the twentieth stage of the shift register 3 is illustrated in the last line of FIGURE 4.

Figure 5:
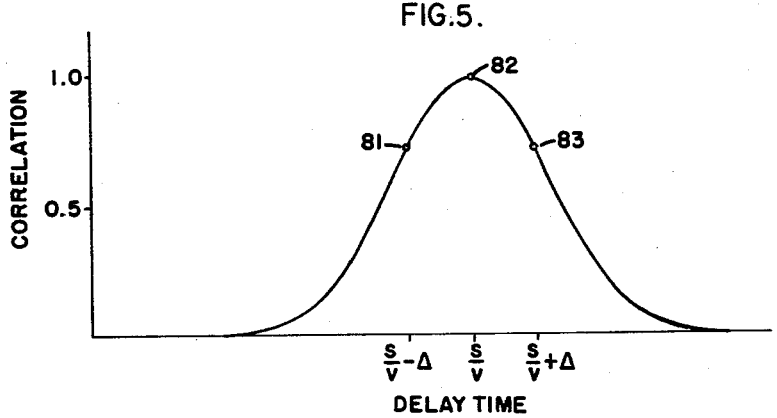
FIGURE 5 is a graph of the correlation between a delayed signal and a second signal as a function of delay time, for the FIGURE 4 pulse trains.

The outputs of coincidence detectors 61 and 63 are of the same form as that of coincidence detector 62 as shown in the sixth line of FIGURE 5. However, since the signals $A(t)$ as delayed by shift register 33 which are applied to these detectors are delayed by different times ($\pm\Delta$), the coincidences will be decreased.

The correlation between a pulse train $A(t)$ and a delayed pulse train $B(t)$ is plotted in FIGURE 5 as a function of time delay. The function is symmetrical about a maximum correlation obtained at 82 for a delay time equal to the time the vehicle requires to traverse the distance between the antennae, that is, $s/v$. The FIGURE 5 graph shows a decreasing correlation for all delay times diverging from the optimum correlation 82 as $s/v$. This is to be expected from a random function, but if there is a periodic component in the pulse train, the correlation function will have recurring, but decreasing peaks, for delay times diverging from $s/v$. In maintaining the proper delay time in the apparatus of FIGURE 3, outputs are taken from shift register 33 which respectively lead and lag the optimum correlation pulse train by a time increment $\Delta$. The correlation for these pulse trains are shown in FIGURE 5 at 81 and 83. Because these pulse trains are equally close to the optimum correlation, the correlations remain equally high. It is these correlations which appear as inputs in the differential D.C. amplifier 64. If because of a change in vehicle velocity or some other cause, the measured velocity becomes incorrect, then the inputs to amplifier 64 will become unequal. In accordance with the integrated magnitude of the differential and the polarity, an error signal is obtained from integrator 65 which changes the frequency of oscillator 66 until the outputs of correlators 61 and 63 are again matched.

However, since the correlation function of the FIGURE 4 type may have a plurality of peaks, it may be necessary to provide a coarse speed measurement to eliminate ambiguity. It is for this purpose that a third antenna 15 is provided close to antenna 13, as illustrated in FIGURE 2. In FIGURE 3, a single pole, double throw switch, C, is illustrated to represent provision for connecting the antenna 15 signal to the receiver channel 31 in place of the antenna 14 signal which effectively pairs antenna 15 with antenna 13 for the coarse mode. Since the delay time for optimum correlation of the received signals is proportional to the antennae displacement, the number of stages of the shift register must be correspondingly reduced for the same calibration for oscillator 66. Accordingly, the single pole, double throw, switch C' is provided to switch the output of receiver channel 31 to a higher stage of shift register 33 which is selected to provide a proper delay to the register output during the acquisition mode.

Also illustrated in FIGURE 3 is apparatus for providing data as to roll, pitch and yaw relative to the direction of the velocity vector. The center of the three selected outputs of shift register 33, stage 20 in the preferred embodiment, is connected to coincidence detector 62 in parallel with the channel 32 output. Since 61 and 63 provide a delay time to the channel 31 output equal to the antenna spacing traversal time, the detector 62 output for a given time interval will have the optimum correlation obtainable. As stated above, the antennae are arranged slightly displaced from the wand 16 axis. Because of this displacement, there will be a cyclic variation at the wand rotation rate (in the absence of roll) in the correlation obtained for reasons to be explained below. This cyclic variation in the correlation is in the form of a sinusoidal envelope of the coincidences produced in the detector 62 output. The envelope has an amplitude proportional to the sine of the angle between the vehicle velocity vector and the attitude of the vehicle and a phase determined by the pitch and yaw of the vehicle.

The output of coincidence detector 62 is connected to a 10 c.p.s. band pass amplifier 71 which amplifies the envelope of the coincidences, removing the D.C. component. The amplifier output is connected in parallel to a pair of conventional synchronous demodulators 73 and 74. A synchronized 10 c.p.s. oscillator 72 produces sinusoidal reference signals in synchronism with the antenna wand rotation. The output of the synchronized oscillator 72 is connected directly to synchronous demodulator 74 and is connected to synchronous demodulator 73 through a 90° phase shift network 77 The outputs of the demodulators 73 and 74 will accordingly be proportional to the yaw and pitch components of the vehicle. These signals are suitable for controlling pitch and yaw servos which adjust the vehicle's attitude by means of auxiliary jets or the like.

To measure roll rate, the outputs of band pass amplifier 71 and synchronized oscillator 72 are connected to a bidirectional counter 80. Since the rate of roll is the difference between the antenna rotation frequency and the frequency of the envelope of coincidences, the rate of roll is simply measured by subtracting these frequencies. To minimize the effect of noise, the output of band pass amplifier 71 is preferably connected to a synchronized oscillator 79, which provides a shaped sinusoidal signal that is subtracted from the reference signal in the bidirectional counter 80. The output of counter 80 controls the roll servo 78 which adjusts the vehicle attitude by means of auxiliary jets or the like.

Figure 6:
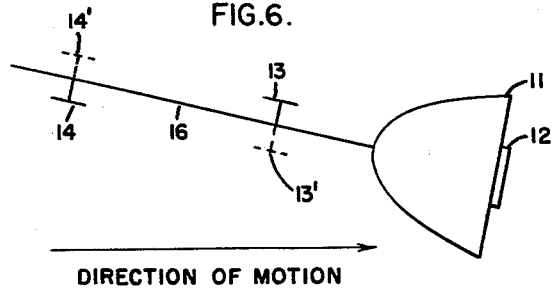
FIGURE 6 is an illustration of the relation between the positions of the vehicle antennae of FIGURE 2 and the direction of motion for a particular attitude of the vehicle.

FIGURE 6 is an illustration of the relation between the positions of the vehicle antennae of FIGURE 2 and the direction of motion for a particular attitude of the vehicle. When the antenna wand axis is aligned with the vehicle trajectory, the distance between the trajectories of the individual antennae is a constant. However, if the wand is at an angle to the vehicle trajectory as in FIGURE 6, the distance between the individual antenna trajectories varies substantially sinusoidally. Since the correlation of the signals received by the antennae is a function of the displacement of the antennae trajectories, the correlation of the received signals will vary sinusoidally as the antenna wand rotates. FIGURE 6 is a special case of a vehicle attitude where the minimum spacing of the antennae trajectories is zero. That is, as the wand rotates the antennae move from the position illustrated in solid lines at 13 and 14, where the antennae follow a common trajectory parallel to the direction of motion, to a position of maximum displacement of the antennae trajectories a half wand rotation later, as illustrated in dashed lines at 13' and 14'. The correlation of the received signals will correspondingly vary with the wand rotation producing a substantially sinusoidal variation corresponding to the simple harmonic motion of the antennae. For a vehicle attitude closer to the direction of vehicle motion than that illustrated in FIGURE 6 the sinusoidal variation in correlation will have a correspondingly smaller amplitude. Also, the phase of the sinusoidal variation in correlation is determined by vehicle pitch and yaw because the plane containing the maximum and minimum displacements of the antennae coincides with the plane determined by the vehicle velocity vector and the vehicle axis. Accordingly, the yaw and pitch of the vehicle can be measured by resolving the sinusoidal variation in correlation in accordance with the known rotation of the antenna wand relative to the vehicle.

In designing apparatus for navigation in the vicinity of the moon, transmitting apparatus for radiation from the earth typically requires an 85 foot steerable antenna.

A C.W. radiated power of ten kilowatts at a frequency of two kilomegacycles is suitable.

The preferred embodiment disclosed utilizes measurements derived from C.W. signals. Without varying this mode of measurement, additional information can be derived from pulse modulation of the C.W. signal if higher power signal transmission is available. With pulse modulation, it is possible to measure directly the height of a vehicle relative to the moon by measuring the time differential between the arrival of a pulse directly from the earth and the arrival of the earliest reflected pulse. The time differential is a function of both the height and the local lunar vertical relative to the earth-to-moon line. That is, displacement of a vehicle from the line between the transmitter and the center of the moon will increase the time differential. The relation is simple, a given time differential determines a paraboloid surface from whch the pulse is reflected. From the pervious measurements, a determination of the local lunar vertical of the vehicle enables resolution of the vehicle height. However, a simpler mode of operation is based on the knowledge of the vehicle trajectory which is generally accurately known before the vehicle flight is made. Accordingly, the time differential can be calibrated directly into height.

A large variety of probe antenna designs can be used. In the illustrated embodiment, the anntennae are dipoles which are suitable for a vehicle which has a substantial cross section. It is normally desirable to eliminate signals reflected from the vehicle to the probe antennae and the conventional dipoles are accordingly designed with nulls in the direction of the main body of the vehicle.

It is not necessary to physically rotate one or both of the antennae to obtain the periodic variations in the received signals for attitude sensing. The design can utilize an array of antennae with a switching arrangement to simulate rotary scanning. With switched antennae, the antennae would not necessarily have axial symmetry. It may be desirable to have directivity which compensates for differential shadowing effects of the vehicle. The antennae may be either directive or non-directive, however, if they are directive, the pairs of antennae which are being compared must have nearly the same directivity. A certain amount of directivity in the antenna pairs may be desirable to increase the proportion of the energy received by scattering from the moon's surface as opposed to that by specular reflection. The latter tends to be stronger from smoother portions of the moon's surface and tends to introduce undesirable periodicities in the correlation function. Directive antennae will minimize the specular reflection reception over a large part of the switching cycle.

The illustrative embodiment of the invention is arranged only to measure roll rate and a limited range of yaw and pitch. This arrangement is most suitable for vehicles in which the attitude of the vehicle is continously corrected to maintain alignment with the direction of motion. That is, it is suitable where the pitch, roll and yaw data, obtained as described above, is used to produce commands for continuously stabilizing the vehicle by means of auxiliary jets or flywheels. If larger ranges of data are desired, a suitable modification provides a pivoted antenna structure which is then stabilized in accordance with the yaw, pitch and roll error data by conventional servo techniques, the error data being measured as described above. Another arrangement requires stabilizing only a portion of the vehicle such as the braking rocket in accordance with the attitude data.

It is to be understood that the invention is not to be considered limited to the specific embodiments described for operation in the vicinity of the moon. The invention is applicable also to terrestrial navigation. For example, an electromagnetic standing wave pattern may be established in the vicinity of the earth by a transmitter radiating from a satellite which is fixed relative to the earth. With such a wave pattern, the same vehicle borne receiving apparatus as described above would measure velocity and attitude relative to the earth.

It is also to be understood that the standing wave pattern need not be of an electromagnetic nature but wave phenomena such as sonic propagation in fluid media provides an analog of electromagnetic interference which is measurable by corresponding apparatus. The true scope of the invention, including those variations apparent to one skilled in the art, is defined in the following claims.

What is claimed is:

1. Apparatus for measuring the velocity of a body relative to a spatial reference comprising: at least two displaced, wave radiating means for providing a standing wave pattern with respect to said spatial reference; first and second probe antennae arranged on said body at displaced positions along an axis for which the velocity measurement is to be made; and receiving means connected to said antennae and adapted to measure the time differential between which the substantially like signal trains are received at said antennae.

2. Apparatus for measuring the velocity of a first body relative to a second body where a standing wave pattern is produced relative to the second body comprising: a pair of probe means, responsive to the standing wave pattern, arranged on said first body at displaced positions along an axis for which the velocity measurement is to be made; and receiving means connected to said probe means and adapted to measure the time differential between which the substantially like signal trains are received at said probe means.

3. Apparatus for measuring the velocity of a first body relative to a second body comprising: first radiating means, a substantially fixed distance from the second body, to radiate a wave signal; second radiating means, displaced from said first radiating means and a substantially fixed distance therefrom, to radiate a second wave signal in such a manner as to provide a standing wave pattern relative to said second body; first and second probe means arranged on said first body at displaced positions along an axis for which the velocity measurement is to be made; and receiving means connected to said probe means and adapted to measure the time differential between which the substantially like signal trains are received at said probe means.

4. Apparatus for measuring the velocity of a vehicle relative to an astronomical body comprising: radiating means substantially radially fixed relative to the astronomical body for producing a standing wave pattern by the radiation of electromagnetic waves and reradiation from the surface of the astronomical body; first and second probe antennae arranged on said vehicle along an axis for which the velocity measurement is to be made; and receiving means connected to said antennae and adapted to measure the time differential between which the substantially like signal trains are received at said antennae.

5. The apparatus of claim 4 wherein: said radiating means is affixed to the earth; and said astronomical body is the moon which reradiates the radiations emanating from the earth.

6. The method of measuring the velocity of a vehicle relative to the moon comprising: radiating a microwave signal from the earth to produce a standing wave pattern from reradiation from the moon's surface; detecting the standing wave pattern at a pair of displaced positions along the vehicle axis for which the velocity measurement is to be made; and measuring the time differential between the substantially like signals which are detected.

7. Apparatus for measuring the velocity and attitude of a vehicle relative to an astronomical body where a standing wave pattern is produced relative to the astronomical body comprising: a pair of probe means responsive to the standing wave pattern arranged on said vehicle at displaced positions along an axis for which the velocity measurement is to be made, at least one of said probe means being displaced radially from said axis to produce variations in the received signals relative to the signals received by the other probe means as a function of vehicle attitude; means to produce a rotating scan by said probe means relative to the axis along which velocity is measured; variable delay means connected to the leading probe means to provide a time delay to the leading received signal such as to synchronize the leading and lagging received signals; correlation means connected to the output of said delay means and the lagging one of said probe means and arranged to compare the received signals to provide a control signal which is connected to said delay means to maintain optimum correlation of said received signals; and roll measuring means adapted to measure the difference between the frequency of rotation of said probe means and the frequency of periodic variation in the correlation output.

8. Apparatus for measuring the velocity and attitude of a vehicle relative to an astronomical body where a standing wave pattern is produced relative to the astronomical body comprising: a pair of probe means responsive to the standing wave pattern arranged on said vehicle at displaced positions along an axis for which the velocity measurement is to be made, at least one of said probe means being displaced radially from said axis to produce variations in the received signals relative to the signals received by the other probe means as a function of vehicle attitude; means to produce a rotating scan by said probe means relative to the axis along which velocity is measured; variable delay means connected to the leading probe means to provide a time delay to the leading received signal such as to synchronize the leading and lagging received signals; correlation means connected to the output of said delay means and the lagging one of said probe means and arranged to compare the received signals to provide a control signal which is connected to said delay means to maintain optimum correlation of said received signals; and attitude measuring means connected to said correlation means and responsive to the periodic variations in the correlations obtained to produce an output in accordance with the amplitude of the periodic variations and an output in accordance with phase differential between the periodic variations and the rotating scan.

9. Apparatus for measuring the velocity and attitude of a vehicle relative to an astronomical body where a standing wave pattern is produced relative to the astronomical body comprising: an antenna support, means to rotate said antenna support about an axis along which velocity is to be measured, a pair of antennae mounted on said antenna support at positions displaced along said axis and at least one of said antennae being radially displaced from said axis, variable delay means connected to the leading antenna to provide a time delay to the leading received signal such as to synchronize the leading and lagging received signals; correlation means connected to the output of said delay means and the lagging one of said antennae and arranged to compare the received signals to provide a control signal which is connected to said delay means to maintain optimum correlation of said received signals; and roll measuring means adapted to measure the difference between the frequency of the antenna support rotation and the frequency of periodic variation in the correlation output.

10. Apparatus for measuring the velocity and attitude of a vehicle relative to an astronomical body where a standing wave pattern is produced relative to the astronomical body comprising: an antenna support, means to rotate said antenna support about an axis along which velocity is to be measured, a pair of antennae mounted on said antenna support at positions displaced along said axis and at least one of said antennae being radially displaced from said axis, variable delay means connected to the leading antennae to provide a time delay to the leading received signal such as to synchronize the leading and lagging received signals; correlation means connected to the output of said delay means and the lagging one of said antennae and arranged to compare the received signals to provide a control signal which is connected to said delay means to maintain optimum correlation of said received signals; roll measuring means adapted to measure the difference between the frequency of the antenna support rotation and the frequency of periodic variation in the correlation output, and pitch and yaw measuring means adapted to measure the amplitude of said periodic variations in correlation and to measure the phase differential between said periodic variations and the rotation of said antenna support.

References Cited in the file of this patent
UNITED STATES PATENTS
2,083,945     Evans _____ June 15, 1937